United States Patent
Kim et al.

(10) Patent No.: US 12,008,070 B2
(45) Date of Patent: Jun. 11, 2024

(54) METHOD AND APPARATUS FOR PREDICTING TIME-SERIES DATA

(71) Applicant: Samsung Electronics Co., Ltd., Suwon-si (KR)

(72) Inventors: Jooyoo Kim, Suwon-si (KR); Hyungseon Song, Suwon-si (KR); Kyungjae Kim, Suwon-si (KR); Chandra Ashok Maloo, Suwon-si (KR); Dongjun Shin, Suwon-si (KR); Pavan Kumar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/344,187

(22) Filed: Jun. 29, 2023

(65) Prior Publication Data

US 2023/0342421 A1 Oct. 26, 2023

Related U.S. Application Data

(63) Continuation of application No. 17/147,840, filed on Jan. 13, 2021, now Pat. No. 11,734,388.

(30) Foreign Application Priority Data

Jan. 17, 2020 (KR) .................. 10-2020-0006663

(51) Int. Cl.
  *G06F 17/18* (2006.01)
  *F24F 11/47* (2018.01)
  (Continued)

(52) U.S. Cl.
  CPC .............. *G06F 17/18* (2013.01); *F24F 11/47* (2018.01); *F24F 11/56* (2018.01); *F24F 11/63* (2018.01);
  (Continued)

(58) Field of Classification Search
  CPC ...................................... G06F 17/18
  See application file for complete search history.

(56) References Cited

U.S. PATENT DOCUMENTS 7,734,451 B2   6/2010  Macarthur et al.
9,390,388 B2 * 7/2016  Drees ................ G01R 21/1333
(Continued)

FOREIGN PATENT DOCUMENTS

JP        1185213 A     3/1999
JP     2015-023668 A    2/2015
(Continued)

OTHER PUBLICATIONS

International Search Report dated Mar. 26, 2021, issued in International Application No. PCT/KR2020/018677.

*Primary Examiner* — Nathan L Laughlin
(74) *Attorney, Agent, or Firm* — Jefferson IP Law, LLP

(57) ABSTRACT

A time-series data prediction method is provided. The method includes storing a time-series model, inputting time-series data to the time-series model, and outputting a plurality of pieces of prediction data which is a preset number of pieces of prediction data or more based on the time-series model. The inputting of the time-series data to the time-series model includes substituting invalid data included in the time-series data with preset valid data, and inputting the time-series data including the valid data to the time-series model.

19 Claims, 9 Drawing Sheets

(51) Int. Cl.
    *F24F 11/56*         (2018.01)
    *F24F 11/63*         (2018.01)
    *G06N 20/00*        (2019.01)
    *H04L 67/125*       (2022.01)
    *F24F 140/60*      (2018.01)

(52) U.S. Cl.
    CPC ........... *G06N 20/00* (2019.01); *H04L 67/125* (2013.01); *F24F 2140/60* (2018.01)

(56) References Cited

U.S. PATENT DOCUMENTS

| | | |
|---|---|---|
| 9,852,481 B1 | 12/2017 | Turney et al. |
| 2013/0027220 A1 | 1/2013 | Marwah et al. |
| 2018/0052804 A1 | 2/2018 | Mikami et al. |
| 2019/0081637 A1 | 3/2019 | Pool |
| 2019/0122132 A1* | 4/2019 | Rimini .................. G06Q 50/06 |
| 2019/0166026 A1 | 5/2019 | Konakalla et al. |
| 2020/0313434 A1* | 10/2020 | Khanna .................. G06N 3/044 |
| 2021/0056409 A1 | 2/2021 | Murugesan et al. |
| 2021/0191348 A1 | 6/2021 | Lee et al. |

FOREIGN PATENT DOCUMENTS

| | | |
|---|---|---|
| JP | 2020151879 A | 9/2020 |
| JP | 6809105 B2 | 1/2021 |
| KR | 10-2018-0060317 A | 6/2018 |
| KR | 10-2019-0051243 A | 5/2019 |
| KR | 10-2020-0039970 A | 4/2020 |

\* cited by examiner

| case2 | UsedEnegy(W) |
|---|---|
| 2019-08-01 | 7000 |
| 2019-08-02 | 8000 |
| 2019-08-03 | 9000 |
| 2019-08-04 | 10000 |
| 2019-08-05 | 11000 |
| 2019-08-06 | 0 |
| 2019-08-07 | 0 |

METHOD AND APPARATUS FOR PREDICTING TIME-SERIES DATA

CROSS-REFERENCE TO RELATED APPLICATION(S)

This application is a continuation application of prior application Ser. No. 17/147,840, filed on Jan. 13, 2021, which is based on and claims priority under 35 U.S.C. § 119(a) of a Korean patent application number 10-2020-0006663, filed on Jan. 17, 2020, in the Korean Intellectual Property Office, the disclosure of which is incorporated by reference herein in its entirety.

BACKGROUND

1. Field

The disclosure relates to a time-series data prediction method and apparatus for raising accuracy of prediction data based on time-series data.

2. Description of Related Art

An artificial intelligence (AI) system that implements a human's intelligence is used in various fields. The AI system is a system in which a machine itself learns and makes judgments, unlike a rule-based smart system. The AI system improves its recognition rate with use to thus more accurately understand a user's tastes. For this reason, the existing rule-based smart system is being gradually substituted by deep learning-based AI system.

AI technology is configured with machine learning (for example, deep learning) and element technology using machine learning.

The machine learning is algorithm technology that classifies/learns features of input data, and the element technology is technology of emulating the cognitive function, judgment function, etc. of a human brain by using a machine-learning algorithm such as deep learning, and is configured with technical fields, such as linguistic understanding, visual understanding, inference/prediction, knowledge representation, motion control, etc.

AI technology may be applied to various fields. For example, linguistic understanding is a technology of recognizing and applying/processing a human's languages/characters, and includes natural language processing, machine translation, dialogue system, question and answer, voice recognition/synthesis, etc. Visual understanding is a technology of recognizing and processing objects similar to human vision, and includes object recognition, object tracking, image search, human recognition, scene understanding, space understanding, image enhancement, etc. Inference prediction is a technology of judging information to logically infer and predict, and includes knowledge/probability-based inference, optimization prediction, preference-based plan, recommendation, etc. Knowledge representation is a technology of automating a human's experience information to knowledge data, and includes knowledge construction (data creation/classification), knowledge management (data utilization), etc. Motion control is a technology of controlling a vehicle's autonomous driving and motions of a robot, and includes movement control (navigation, collision, and driving), operation control (behavior control), etc.

An air conditioner, that may be used for adjusting a temperature, humidity, clean level, air current, etc. of an indoor space, may be distributed. The air conditioner can collect time-series data such as power consumption, and predict future power consumption through the element technology using machine learning. However, existing time-series analysis has low prediction performance when there is invalid data corresponding to power consumption of 0.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a time-series data prediction method and apparatus for raising accuracy of prediction data and providing a high-quality service through high accuracy by performing time-series analysis based on input data substituting invalid data.

Additional aspects will be set forth in part in the description which follows and, in part, will be apparent from the description, or may be learned by practice of the presented embodiments.

In accordance with an aspect of the disclosure, a time-series data prediction method is provided. The method includes storing a time-series model, inputting time-series data to the time-series model, and outputting a plurality of pieces of prediction data which is a preset number of pieces of prediction data or more through the time-series model, wherein the inputting of the time-series data to the time-series model includes substituting invalid data included in the time-series data with preset valid data, and inputting the time-series data including the valid data to the time-series model.

The time-series data prediction method may further include restoring prediction data substituted with the valid data among the plurality of pieces of prediction data output from the time-series model to the invalid data.

The restoring of the prediction data substituted with the valid data among the plurality of pieces of prediction data output from the time-series model to the invalid data may include restoring the prediction data being a part of the plurality of pieces of prediction data output from the time-series model to the invalid data based on a period of the invalid data included in the time-series data.

The restoring of the prediction data substituted with the valid data among the plurality of pieces of prediction data output from the time-series model to the invalid data may include restoring the prediction data being a part of the plurality of pieces of prediction data output from the time-series model to the invalid data through a probability distribution based on the number of pieces of the invalid data included in the time-series data.

The time-series data prediction method may further include comparing the prediction data based on first time-series data including the valid data with reference data, and determining whether to substitute invalid data included in second time-series data based on a result of the comparing.

The time-series data prediction method may further include comparing first prediction data based on the time-series data including the invalid data with second prediction data based on the time-series data including the valid data.

The time-series data prediction method may further include comparing reference data with the first prediction data or the second prediction data, and determining whether to substitute the valid data based on a result of the comparing.

The valid data may include at least one of a mean value of the time-series data, a minimum value of the time-series data, a maximum value of the time-series data, a regression value of the time-series data, or a random value determined to be at least one of the time-series data.

The time-series model may include at least one of Prophet, Autoregressive Integrated Moving Average (ARIMA), Recurrent Neural Networks (RNN), Long Short-Term Memory models (LSTM), or Sequence-to-Sequence (Seq2Seq).

In accordance with another aspect of the disclosure, an apparatus is provided. The apparatus includes a memory storing a time-series model and time-series data, and a processor configured to substitute invalid data included in the time-series data with preset valid data, input the time-series data including the valid data to the time-series model, and output a plurality of pieces of prediction data which is a preset number of pieces of prediction data or more through the time-series model.

The processor may be further configured to restore prediction data substituted with the valid data among the plurality of pieces of prediction data output from the time-series model to the invalid data.

The processor may be further configured to restore the prediction data being a part of the plurality of pieces of prediction data output from the time-series model to the invalid data based on a period of the invalid data included in the time-series data.

The processor may be further configured to restore the prediction data being a part of the plurality of pieces of prediction data output from the time-series model to the invalid data through a probability distribution based on the number of pieces of the invalid data included in the time-series data.

The processor may be further configured to compare first prediction data based on first time-series data including the invalid data with second prediction data based on first time-series data including the valid data.

The processor may be further configured to compare reference data with the first prediction data or the second prediction data, and determine whether to substitute the valid data based on a result of the comparing.

The processor may be further configured to substitute the invalid data included in second time-series data with the valid data in response to a result of the comparing representing that the second prediction data is more similar to the reference data than the first prediction data, and input the second time-series data including the substituted valid data to the time-series model.

In accordance with another aspect of the disclosure, a system is provided. The system includes an air conditioner configured to collect power consumption, and a server configured to communicate with the air conditioner, wherein the server is configured to collect time-series data including the power consumption for a preset time period from the air conditioner, substitute invalid data included in the time-series data with preset valid data, input the time-series data including the valid data to a time-series model, output a plurality of pieces of prediction data which is a preset number of pieces of prediction data or more through the time-series model, and transmit the plurality of pieces of prediction data to the air conditioner.

The server may be further configured to compare the prediction data with power consumption for the previous year, and determine whether to substitute the valid data based on a result of the comparing.

The server may be further configured to substitute the invalid data included in additionally transmitted power consumption with the valid data in response to a result of the comparing representing that the prediction data is similar to the power consumption for the previous year, and input time-series data including the substituted valid data to the time-series model.

The air conditioner may operate based on prediction data received from the server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
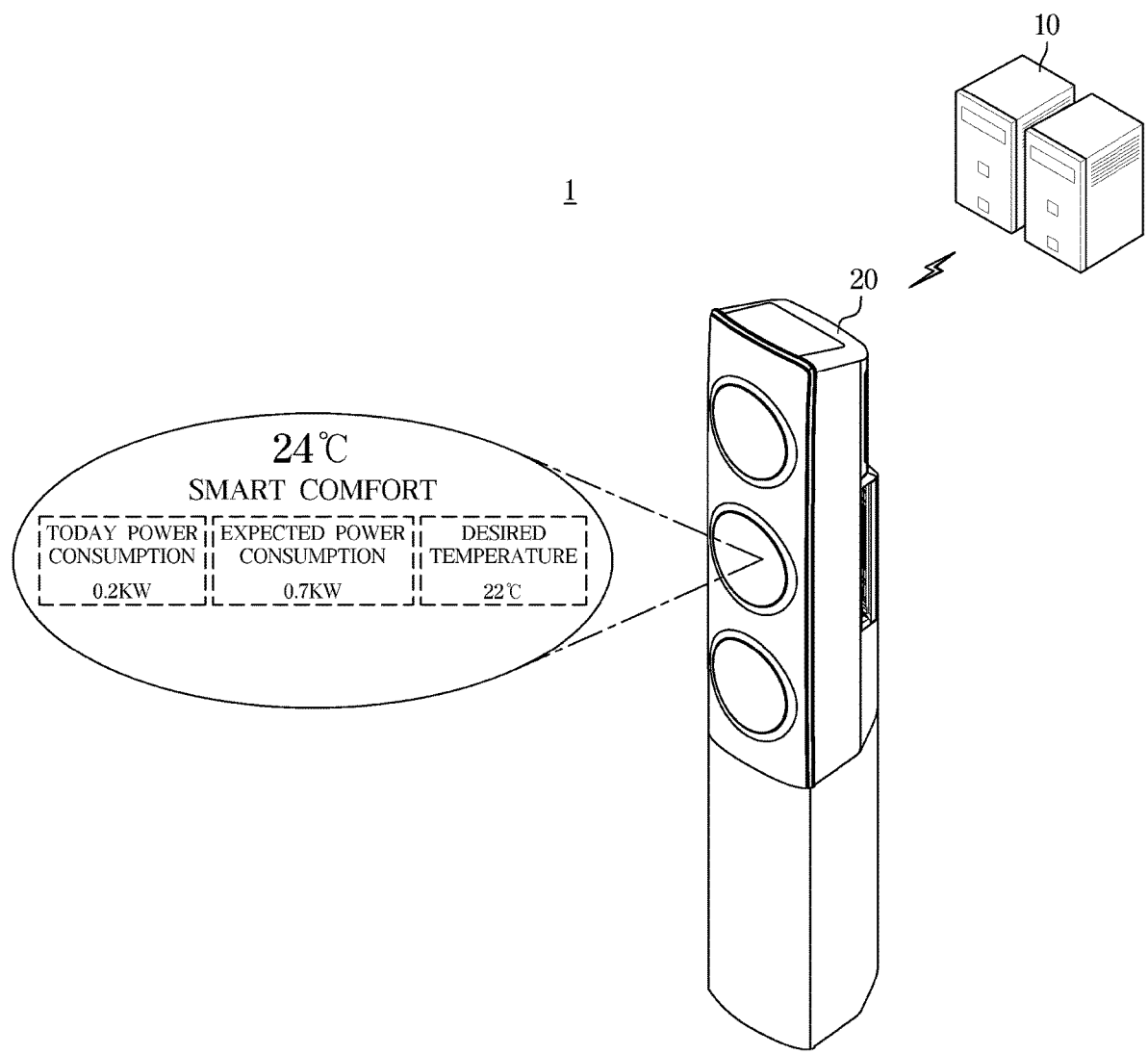
FIG. 1 illustrates an apparatus to which a time-series data prediction method is applied, and a system including the apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when a certain part is referred to as being "connected" to another part, it can be directly or indirectly connected to the other part. When a part is indirectly connected to another part, it may be connected to the other part through a wireless communication network.

Also, it will be understood that when the terms "includes," "comprises," "including," and/or "comprising," when used in this specification, specify the presence of a stated component, but do not preclude the presence or addition of one or more other components.

It will be understood that the terms "first," "second," etc., may be used only to distinguish one component from another, and these components should not be limited by these terms.

Also, it is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is specified in the context.

Throughout the disclosure, the expression "at least one of a, b or c" indicates only a, only b, only c, both a and b, both a and c, both b and c, all of a, b, and c, or variations thereof.

Hereinafter, an operation principle and embodiments of the disclosure will be described with reference to the accompanying drawings.

FIG. 1 illustrates an apparatus to which a time-series data prediction method is applied, and a system including the apparatus according to an embodiment of the disclosure.

Referring to FIG. 1, a system 1 may include a server 10 capable of processing time-series data through a time-series data prediction method, and an air conditioner 20 that receives prediction data from the server 10 or stores the time-series data prediction method provided through the server 2, and outputs prediction data based on collected time-series data.

The server 10 may communicate with the air conditioner 20 through a network, and receive various data collected by the air conditioner 20 from the air conditioner 20. For example, the server 10 may collect data about power consumption of the air conditioner 20 which a user uses for a day. The server 10 may collect time-series data such as power consumption caused by an operation of the air conditioner 20 for a preset time period, and output prediction data such as future power consumption that the user will use.

Meanwhile, the air conditioner 20 may have a limited capacity of a memory 22 (see FIG. 4) due to its structural limit. Accordingly, the server 10 may store time-series data having various sizes, collected from the air conditioner 20 and various other apparatuses except for the air conditioner 20, and output prediction data through a time-series model.

The server 10 may store various time-series models required to calculate prediction data, and learn or update time-series data. A time-series model according to an embodiment of the disclosure may include at least one of Prophet, Autoregressive Integrated Moving Average (ARIMA), Recurrent Neural Networks (RNN), Long Short-Term Memory models (LSTM), or Sequence-to-Sequence (Seq2Seq).

More particularly, Prophet is a time-series analysis library of Facebook™ and is a linear model. ARIMA, which is a model for describing current time-series data by using historical observed values and errors, is a model of increasing accuracy of prediction data even with non-stationary time-series data. RNN is a kind of neural network connected such that the result of a hidden layer again enters the hidden layer as an input of the hidden layer. LSTM is a time-series model obtained by modifying RNN such that backpropagation is well maintained. Seq2Seq, which is a model of outputting a sequence of another domain from an input sequence, is a time-series model mainly used in machine translation. The server 10 may use various models of receiving various time-series data and outputting time-series data, in addition to the above-mentioned time-series models.

The air conditioner 20 may be one of various kinds of apparatuses for keeping an indoor space pleasant through heating, cooling, dehumidifying, humidifying, ventilation, etc. For example, the air conditioner 20 may be implemented as a fan heater, a heater, or an air conditioner capable of performing both heating and cooling. The air conditioner 20 may include an indoor unit and an outdoor unit. The indoor unit may be connected to the outdoor unit, and the indoor unit may exchange a refrigerant with the outdoor unit through a pipe. The air conditioner 20 configured with the indoor unit and the outdoor unit may include various operation modes, such as a cooling mode for lowering temperature of indoor air, a heating mode for raising temperature of indoor, a blow mode for forming air current in an indoor space, and a dehumidification mode for lowering indoor humidity.

The air conditioner 20 may be set to one of various modes by a user, as shown in FIG. 1.

For example, a tropical night good-sleep mode may be an operation of adjusting temperature of a space in which the air conditioner 20 is installed to desired temperature (or preferred temperature based on a use history) set by a user for a preset time period, for example, from 1 am to 5 am.

According to another example, a smart comfort mode may be a mode of automatically operating the air conditioner 20 based on desired temperature and periodical power consumption. More particularly, in the smart comfort mode, the air conditioner 20 may perform an operation of analyzing power consumption 0.2 kilowatts (KW) used up to current time today based on expected power consumption 0.7 KW predicted by a time-series model, and lowering temperature 24 degrees centigrade (° C.) of a space in which the air conditioner 20 is installed to desired temperature 22° C. based on extra power consumption. For the operation, the air conditioner 20 may receive a time-series model and a user's time-series data up to now from the server 10 and output prediction data, or may use prediction data output from the server 10.

Meanwhile, an example such as the above-described smart comfort mode may be an embodiment of using time-series data, and prediction data may be used in various services.

Figure 2A:
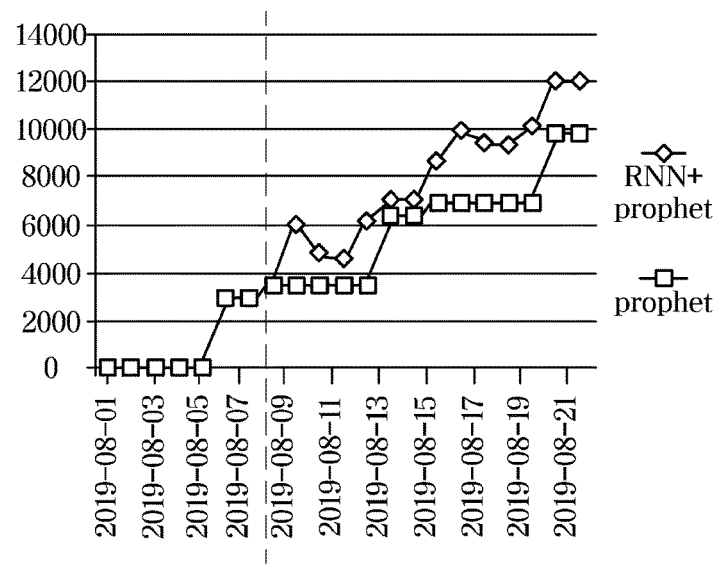
FIGS. 2A and 2B are diagrams for describing an effect of a time-series data prediction method according to various embodiments of the disclosure.
Figure 2B:
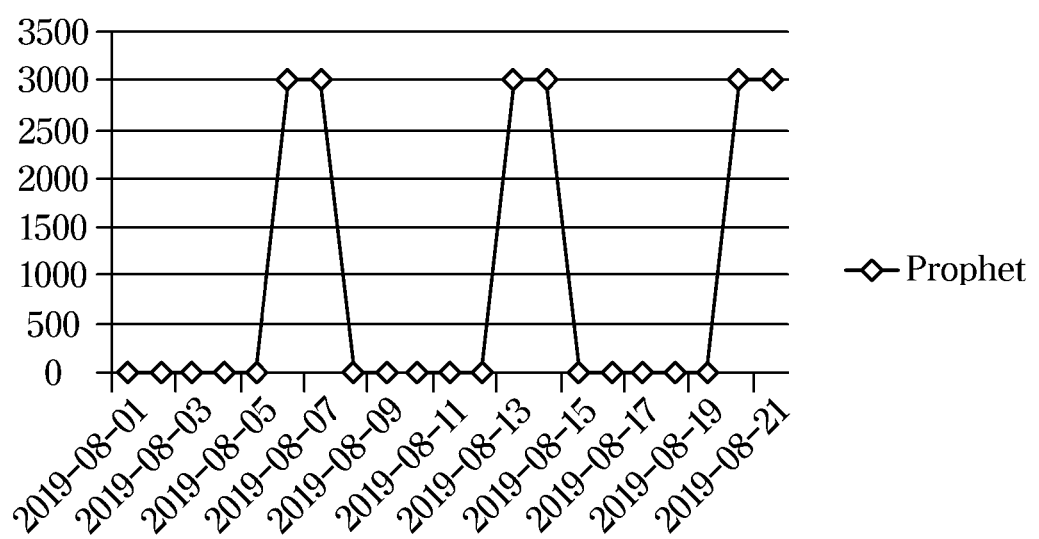

FIGS. 2A and 2B are diagrams for describing an effect of a time-series data prediction method according to various embodiments of the disclosure.

Referring to FIG. 2A, time-series data (hereinafter, referred to as first time-series data) according to an example may be power consumption of an electronic apparatus from Aug. 1, 2019, to Aug. 7, 2019. The first time-series data may include power consumption 0 watts (W) from Aug. 1, 2019, to Aug. 5, 2019, and power consumption 3000 W from Aug. 6, 2019, to Aug. 7, 2019. As results of inputting the first time-series data having a value of 0 to time-series models Prophet and a combination of Prophet and RNN, a graph shown in FIG. 2A may be output as prediction data.

More particularly, Prophet has output prediction data 3500 W from Aug. 8, 2019, to Aug. 12, 2019 and prediction data 6200 W from Aug. 13, 2019, to Aug. 14, 2019. Also, Prophet has output prediction data 6300 W from Aug. 15, 2019, to Aug. 19, 2019, and prediction data 10000 W from Aug. 20, 2019, to Aug. 21, 2019. That is, a known time-series model Prophet has output prediction data based on a slope of the first time-series data, that is, increasing periodicity of the first time-series data.

The time-series model which is the combination of RNN and Prophet has output prediction data having an increase width that is different from that of Prophet, from Aug. 8, 2019, and Aug. 14, 2019. Also, the time-series model has output prediction data about power consumption from Aug. 15, 2019, to Aug. 19, 2019, which is different from prediction data about power consumption from Aug. 8, 2019, to Aug. 14, 2019. However, the time-series model which is the combination of RNN and Prophet also has output continuously increasing prediction data without predicting power consumption including 0.

In comparison, a time-series data prediction method according to an embodiment of the present disclosure has output a graph of FIG. 2B as a prediction model, although using the same Prophet as a time-series model. That is, the time-series data prediction method may predict power consumption from Aug. 8, 2019, to Aug. 12, 2019, as 0 W, and predict power consumption from Aug. 13, 2019, to Aug. 14, 2019, as 3000 W. Also, the time-series data prediction method may predict power consumption from Aug. 15, 2019, to Aug. 19, 2019, as 0 W, and predict power consumption from Aug. 20, 2019, to Aug. 21, 2019, as 3000 W. That is, the time-series data prediction method may treat invalid data such as 0 included in time-series data as valid data, thereby outputting prediction data matching with an actual situation instead of putting weight on increasing periodicity.

Figure 3A:
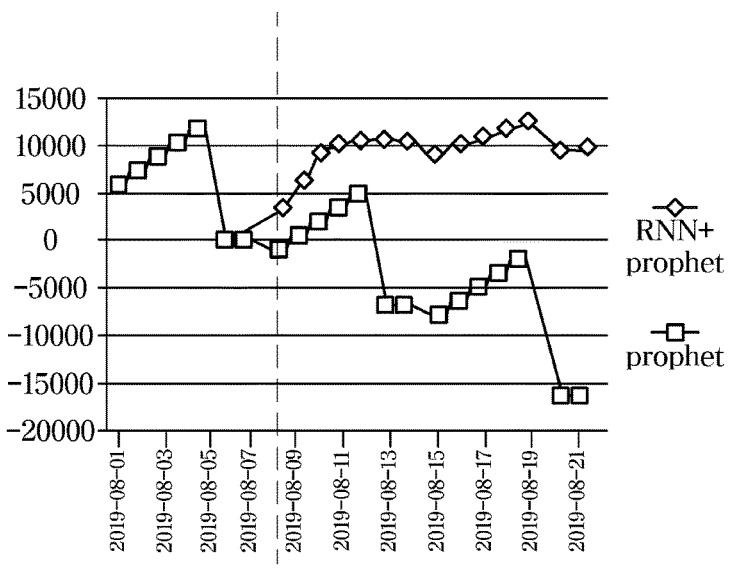
FIGS. 3A and 3B are diagrams for describing an effect of a time-series data prediction method according to various embodiments of the disclosure.
Figure 3B:
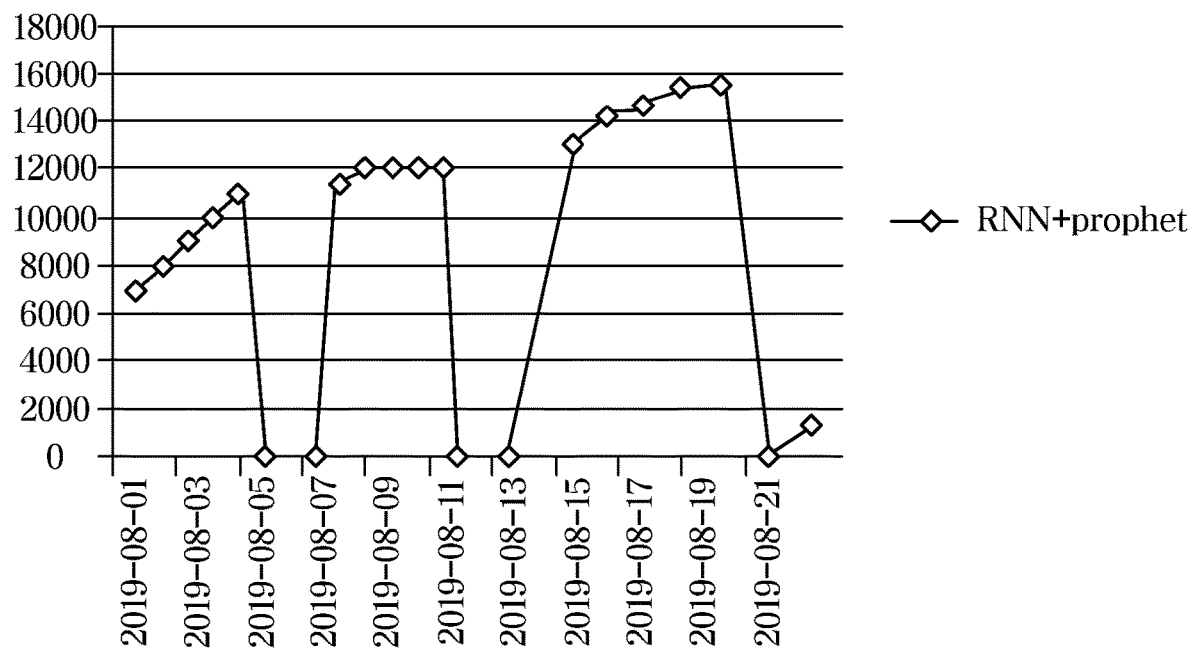

FIGS. 3A and 3B are diagrams for describing an effect of a time-series data prediction method according to various embodiments of the disclosure.

Referring to FIG. 3A, time-series data (hereinafter, referred to as second time-series data) according to another example may be power consumption of an electronic apparatus from Aug. 1, 2019, to Aug. 7, 2019. However, unlike the first time-series data, the second time-series data may include power consumption increasing from 7000 W to 11000 W from Aug. 1, 2019, to Aug. 5, 2019, and power consumption 0 W from Aug. 6, 2019, to Aug. 7, 2019. As results of inputting the second time-series data having a value of 0 to the time-series models Prophet and the combination of Prophet and RNN, a graph shown in FIG. 3A may be output as prediction data.

More particularly, Prophet has output prediction data increasing from −10 W to 3000 W from Aug. 8, 2019, to Aug. 12, 2019, and prediction data of −8000 W from Aug. 13, 2019, to Aug. 14, 2019. Also, Prophet has output prediction data increasing from −9000 W to 5000 W from Aug. 15, 2019, to Aug. 19, 2019, and prediction data of −16000 W from Aug. 20, 2019, to Aug. 21, 2019. That is, as a result of inputting the second time-series data to Prophet, Prophet has output, as prediction data, negative power consumption that does not match with an actual situation.

The time-series model which is the combination of RNN and Prophet does not output negative power consumption, unlike Prophet alone. However, the time-series model which is the combination of RNN and Prophet also has predicted increasing power consumption from Aug. 8, 2019, to Aug. 12, 2019, and predicted power consumption of 9000 W (not 0 W) from Aug. 13, 2019, to Aug. 14, 2019. Also, the time-series model has output power consumption of 9000 W (not 0 W) from Aug. 20, 2019, to Aug. 21, 2019, as prediction data.

The time-series data prediction method may input the second time-series data to the time-series model which is the combination of RNN and Prophet. However, the time-series data prediction model may substitute power consumption of 0 included in the second time-series data with valid data having a predefined value. That is, the time-series data prediction method may input time-series data obtained by substituting data corresponding to Aug. 6, 2019, to Aug. 7, 2019, with valid data to the time-series model, and the time-series model may output similar prediction data which is at a reasonable level.

Referring to a graph of FIG. 3B, the time-series data prediction method may output prediction data including a small increment amount from Aug. 8, 2019, to Aug. 12, 2019, based on the second time-series data. Also, the time-series data prediction method may predict power consumption from Aug. 13, 2019, to Aug. 14, 2019, as 0 W. Also, the time-series data prediction method may output increasing prediction data from Aug. 15, 2019, to Aug. 19, 2019, and predict power consumption from Aug. 20, 2019, to Aug. 21, 2019, as 0 W or 1000 W. That is, the time-series data prediction method may output prediction data corresponding to invalid data such as 0 included in time-series data, thereby outputting prediction data within a range that is understandable by a user.

Figure 4:
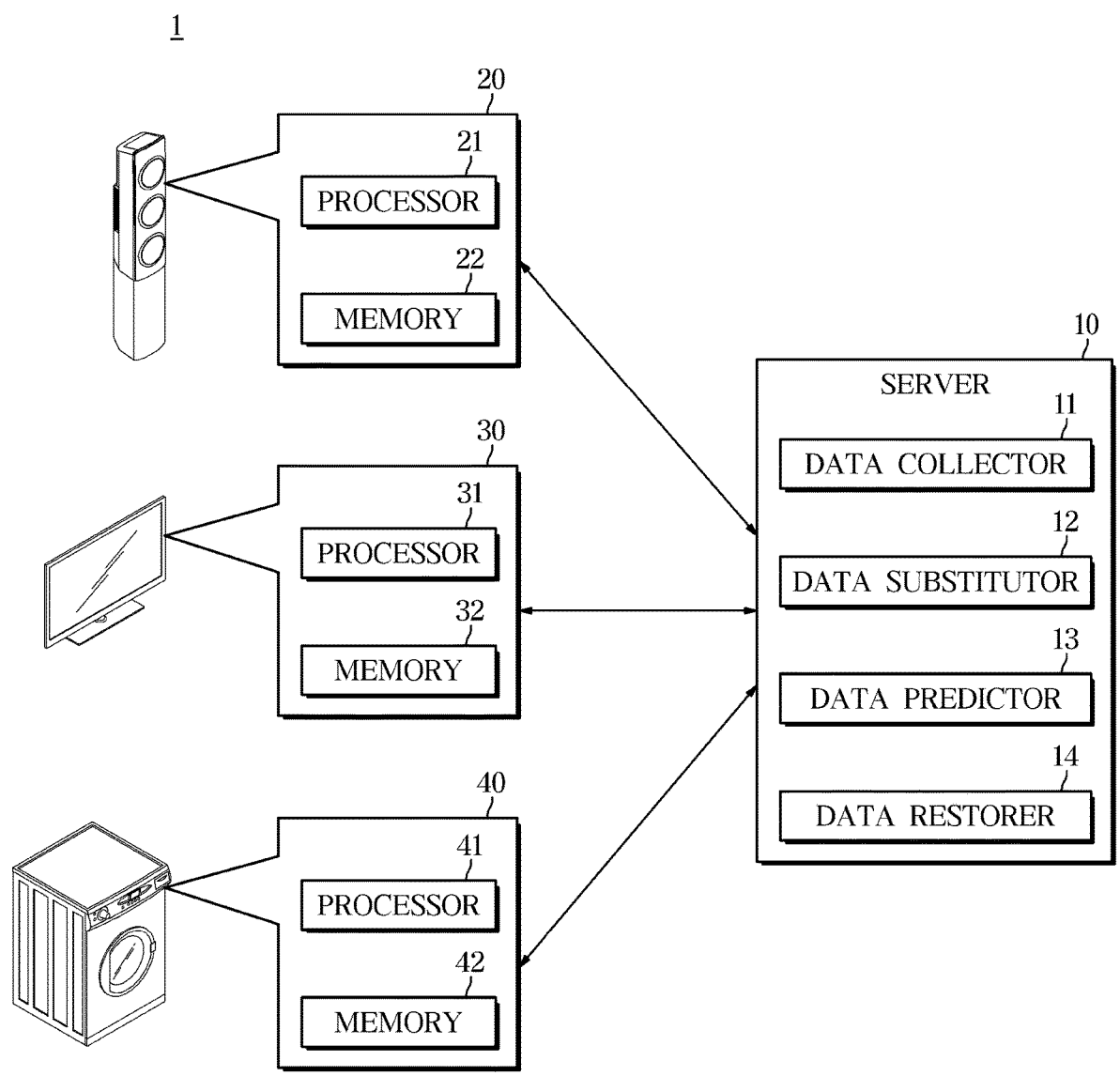
FIG. 4 is a control block diagram of a system according to an embodiment of the disclosure.

FIG. 4 is a control block diagram of a system according to an embodiment of the disclosure.

Referring to FIG. 4, the system 1 may include various apparatuses 20, 30, and 40, and a server 10 communicating with the various apparatuses 20, 30, and 40. Hereinafter, the same description as that given above with reference to FIG. 1 will be omitted.

The server 10 may include a data collector 11 for collecting data through a communication network, a data substitutor 12 for substituting invalid data included in time-series data with valid data, a data predictor 13 for inputting the time-series data including the substituted valid data to a time-series model and outputting prediction data from the time-series model, and a data restorer 14 for again restoring a part of data included in the prediction data to invalid data.

More particularly, the data collector 11 may collect various data from the apparatuses 20, 30, and 40 through the communication network. For example, the data collector 11 may request at least one of the apparatuses 20, 30, and 40 to send time-series data. For example, the data collector 11 may request a display apparatus 30 to send power consumption for a preset time period. According to another example, the data collector 11 may collect power consumption for the same day from the apparatuses 20, 30, and 40, and generate time-series data based on a predefined order. That is, the data collector 11 may collect various time-series data having arrangement forms, such as writings, genes, handwritings, voice signals, data sensed by sensors, and stock prices.

The data substitutor 12 may determine invalid data included in the time-series data and change the invalid data to valid data.

The invalid data means predefined data corresponding to Null data in view of a purpose or intention of the time-series data, and may be a value of 0. However, the invalid value is not limited to the value of 0, and may be a predefined value that is smaller than or equal to preset criterion.

The valid data may be a meaningful value by which the invalid data may be substituted, and may include at least one of a mean value of the input time-series data, a minimum value of the input time-series data, a maximum value of the input time-series data, a regression value of the input time-series data, or a random value determined to be at least one of the input time-series data. That is, the valid data may be any data which the time-series model will not ignore.

For example, first time-series data of (0, 0, 0, 0, 0, 3000, 3200) may be input to the time-series model. In this case, the data substitutor 12 may select 0 as invalid data, and input (3000, 3000, 3000, 3000, 3000, 3000, 3200) obtained by substituting 0 with 3000 to the time-series model.

The data predictor 13 may input the time-series data changed by the data substitutor 12 to the time-series model, and output prediction data. The time-series model selected by the data predictor 13 may include at least one of Prophet, ARIMA, RNN, LSTM, or Seq2Seq. The time-series data prediction method as described above may process time-series data input in advance without changing a time-series model, thereby improving accuracy of prediction data.

The time-series model to which the time-series data including the valid data is input may output no invalid data. The data restorer 14 may insert invalid data such as 0 based on preset criterion and output prediction data that is within a user's allowable range.

The data restorer 14 may restore prediction data corresponding to a part of the prediction data output from the data predictor 13 to the invalid data.

For example, the data restorer 14 may again substitute prediction data corresponding to a sequence location identified from the input time-series data with the invalid data. That is, the data restorer 14 may restore data based on a period of the invalid data included in the time-series data before being substituted.

The data restorer 14 may restore prediction data including the invalid data through a probability distribution based on the number of pieces of the substituted invalid data. For example, the data restorer 14 may calculate empirical probability according to the number of pieces of the invalid data. The data restorer 14 may determine a sequence to be restored through a distribution plot, such as binomial distribution, negative binomial distribution, or geometrical distribution, according to probability calculated from individual sequences of prediction data output in time series, and restore the invalid data in the prediction data.

As a result of inputting first time-series data (0, 0, 0, 0, 0, 3000, 3100) to the time-series model, prediction data (3100, 3100, 3100, 3100, 3100, 3100, 3300) may be output, and the data restorer 14 may restore (0, 0, 0, 0, 0, 3100, 3300) as prediction data based on a period 5 of the first time-series data (0, 0, 0, 0, 0, 3000, 3100).

The data collector 11, the data substitutor 12, the data predictor 13, and the data restorer 14 shown as components of the server 10 have been provided for easy description of the time-series data prediction method. For example, the server 10 may include a plurality of processors and a memory, wherein the processors may perform functions of the components distributively or integratively.

Meanwhile, the time-series data prediction method may be performed not necessarily by the sever 10. An air conditioner 20, a display apparatus 30, and a washing machine 40, which will be described later, may also store time-series data and a time-series model and output prediction data. To store time-series data and a time-series model and output prediction data, the air conditioner 20, the display apparatus 30, and the washing machine 40 may also include processor 21, 31, and 41, and memories 22, 32, and 42, respectively.

More particularly, the air conditioner 20 may include the memory 22 storing time-series data and a time-series model, and the processor 21 for substituting invalid data included in the time-series data with preset valid data, inputting the time-series data including the valid data to the time-series model, and outputting a plurality of pieces of prediction data which is a preset number of pieces of prediction data or more through the time-series model.

The processor 21 may communicate with the server 10 through a wired or wireless communication module (not shown) provided in the air conditioner 20, and receive a time-series model learned by the server 10 or prediction data output from the server 10.

The processor 21 may be a main controller for controlling overall operations of the air conditioner 20, and use an algorithm for controlling operations of components or a program implementing the algorithm. The memory 22 may store a program in a form of an instruction, and the processor 21 may execute the instruction to perform the above-described operations. Meanwhile, the memory 22 and the processor 21 may be implemented as separate chips or a single chip.

The display apparatus 30 may also include the processor 31 for performing the above-described operations, and the memory 32, and the washing machine 40 may also include the processor 41 for performing the above-described operations and the memory 42. That is, the time-series data prediction method may be performed by various apparatuses capable of collecting time-series data, and the kinds of the various apparatuses are not limited.

Figure 5:
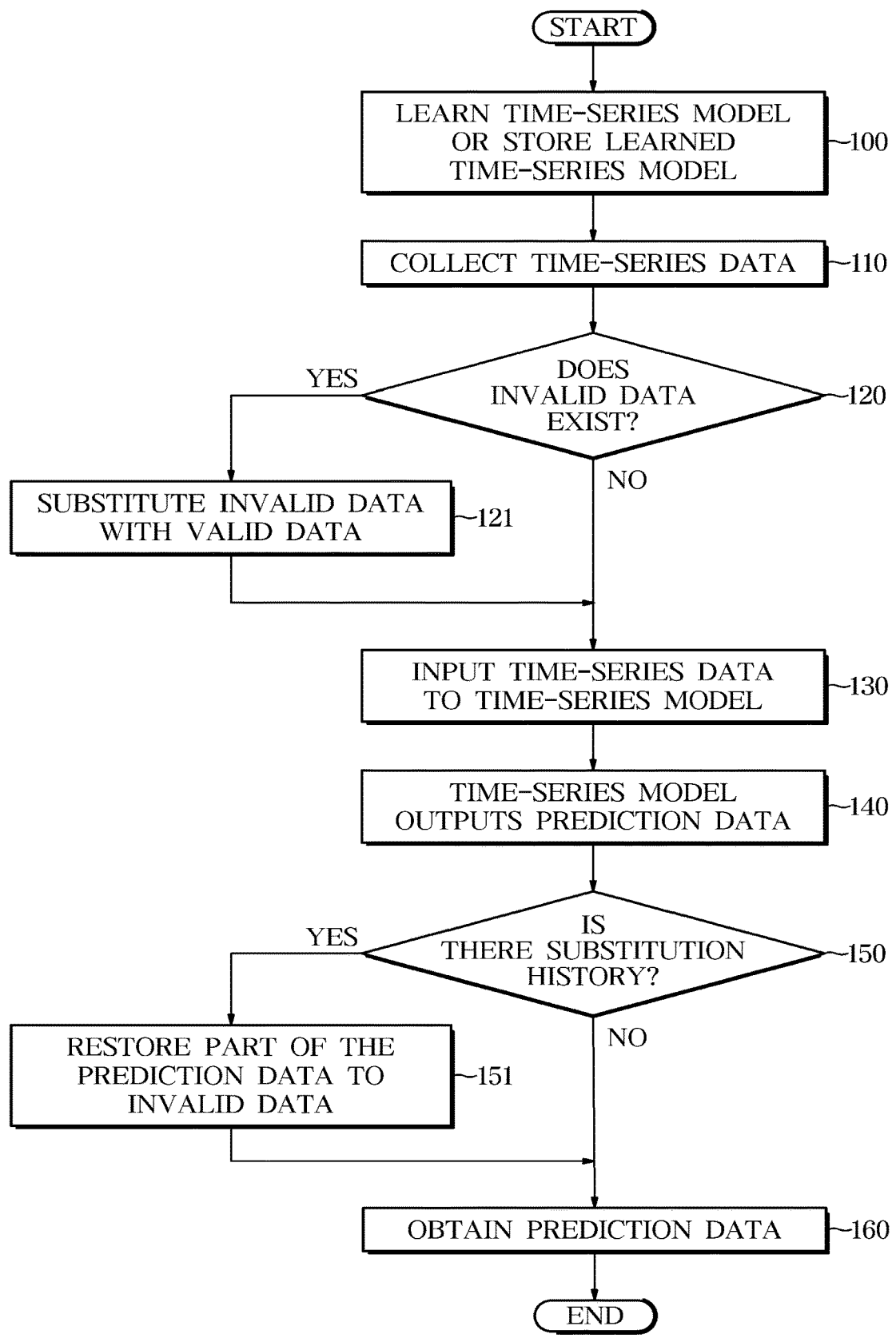
FIG. 5 is a flowchart related to operations of an apparatus to which a time-series data prediction method according to an embodiment of the disclosure.

FIG. 5 is a flowchart related to operations of an apparatus to which a time-series data prediction method according to an embodiment of the disclosure.

Referring to FIG. 5, the apparatus to which the time-series data prediction method is applied may learn a time-series model or store a learned time-series model, in operation 100.

The time-series model may be machine learning of processing various time-series data and outputting prediction data based on the processed time-series data. Accordingly, the apparatus may include one of various apparatuses capable of learning a time-series model or storing a learned time-series model.

The apparatus may collect time-series data, in operation 110.

Various kinds of time-series data may be collected. The above-described embodiment relates to an example of collecting power consumption as time-series data, however, the disclosure is not limited to the example.

The apparatus may determine whether invalid data exists in the time-series data, in operation 120.

The invalid data may correspond to a meaningless value included in the time-series data. In the case of power consumption, ≤0 W has been described as an example of invalid data, however, invalid data is not necessarily limited to ≤0 W. That is, the invalid data may be various data that is smaller than or equal to preset criterion.

In response to a result of a determination that invalid data exists (YES in operation 120), the apparatus may substitute the invalid data with valid data, in operation 121.

The valid data may be at least one of a mean value of the time-series data, a minimum value of the time-series data, a maximum value of the time-series data, a regression value of the time-series data, or a random value determined to be at least one of the time-series data. Also, the valid data may include various data other than the above-mentioned values.

In response to a result of a determination that no invalid data exists (NO in operation 120) or substitution of the invalid data, the apparatus may input the time-series data to a time-series model, in operation 130.

The time-series model may output prediction data, in operation 140. The apparatus may determine whether there is a substitution history, in operation 150.

The apparatus may determine that the invalid data included in the time-series data has been substituted with the valid data as described above. In response to a result of a determination that there is a substitution history (YES in operation 150), the apparatus may restore a part of the prediction data to the invalid data, in operation 151.

More particularly, the apparatus may restore a part of the prediction data to the invalid data through a probability distribution based on a period of the invalid data included in the time-series data or the number of pieces of the invalid data.

In response to a result of a determination that there is no substitution history (NO in operation 150), the apparatus may obtain the prediction data as final prediction data without restoring the invalid data, in operation 160.

Also, the apparatus may obtain the prediction data restored to the invalid data as final prediction data, in operation 160.

Figure 6:
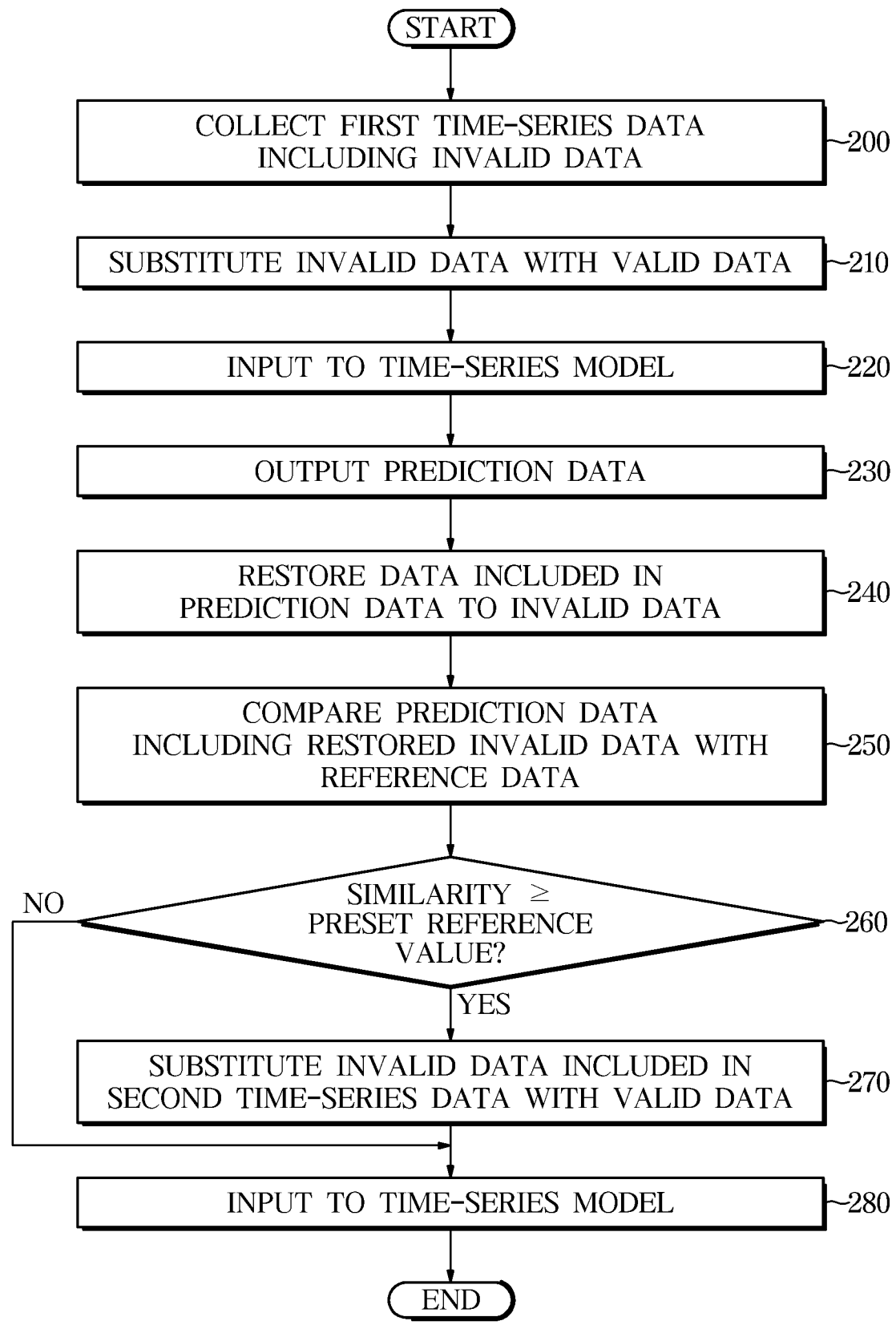
FIG. 6 is a flowchart illustrating a method for improving an effect of a time-series data prediction method according to an embodiment of the disclosure.

FIG. 6 is a flowchart illustrating a method for improving an effect of a time-series data prediction method according to an embodiment of the disclosure.

The time-series data prediction method may examine an effect of time-series data prediction through first time-series data, before outputting prediction data of second time-series data. Herein, the first time-series data may be time-series data about power consumption collected for a preset time period. The second time-series data may be time-series data about power consumption collected for a predefined time period after the preset time period.

The apparatus may collect first time-series data, possibly including invalid data, in operation 200. The apparatus may substitute the invalid data with valid data, in operation 210, and input the first time-series data including the valid data to a time-series model, in operation 220. The time-series model may output prediction data, in operation 230, and the apparatus may restore data included in the prediction data to the invalid data, in operation 240.

The apparatus may compare the prediction data including the restored invalid data with reference data, in operation 250.

The reference data means data that is a standard of prediction data which a user may recognize to be within a normal range.

For example, in the case of first time-series data about power consumption, reference data may be time-series data including power consumption for the previous year. In the case of first time-series data about power consumption from Aug. 1, 2019, to Aug. 30, 2019, power consumption for the same period in the previous year, which is power consumption from Aug. 1, 2018, to Aug. 30, 2018, may be reference data. That is, the apparatus may refer to the reference data to determine accuracy of prediction data.

In response to a result of the comparing representing that similarity between the prediction data and the reference data is greater than or equal to a preset reference value (YES in operation 260), the apparatus may substitute the invalid data included in the second time-series data with valid data, and input the second time-series data including the valid data to the time-series model, in operation 270.

The apparatus according to another embodiment may apply the first time-series data to the time-series data prediction method, and compare a result of the application with the reference data. According to a result of the comparing, the apparatus may apply the time-series data prediction method to processing of the next time-series data.

However, in response to a result of the comparing representing that similarity between the prediction data and the reference data is smaller than the preset reference value (NO in operation 260), the apparatus may input the second time-series data to the time-series model without substituting the invalid data of the second time-series data, in operation 280.

That is, the apparatus may determine that the time-series data prediction method has low accuracy in predicting input time-series data, and determine whether to apply the time-series data prediction method to an additional data input.

Figure 7:
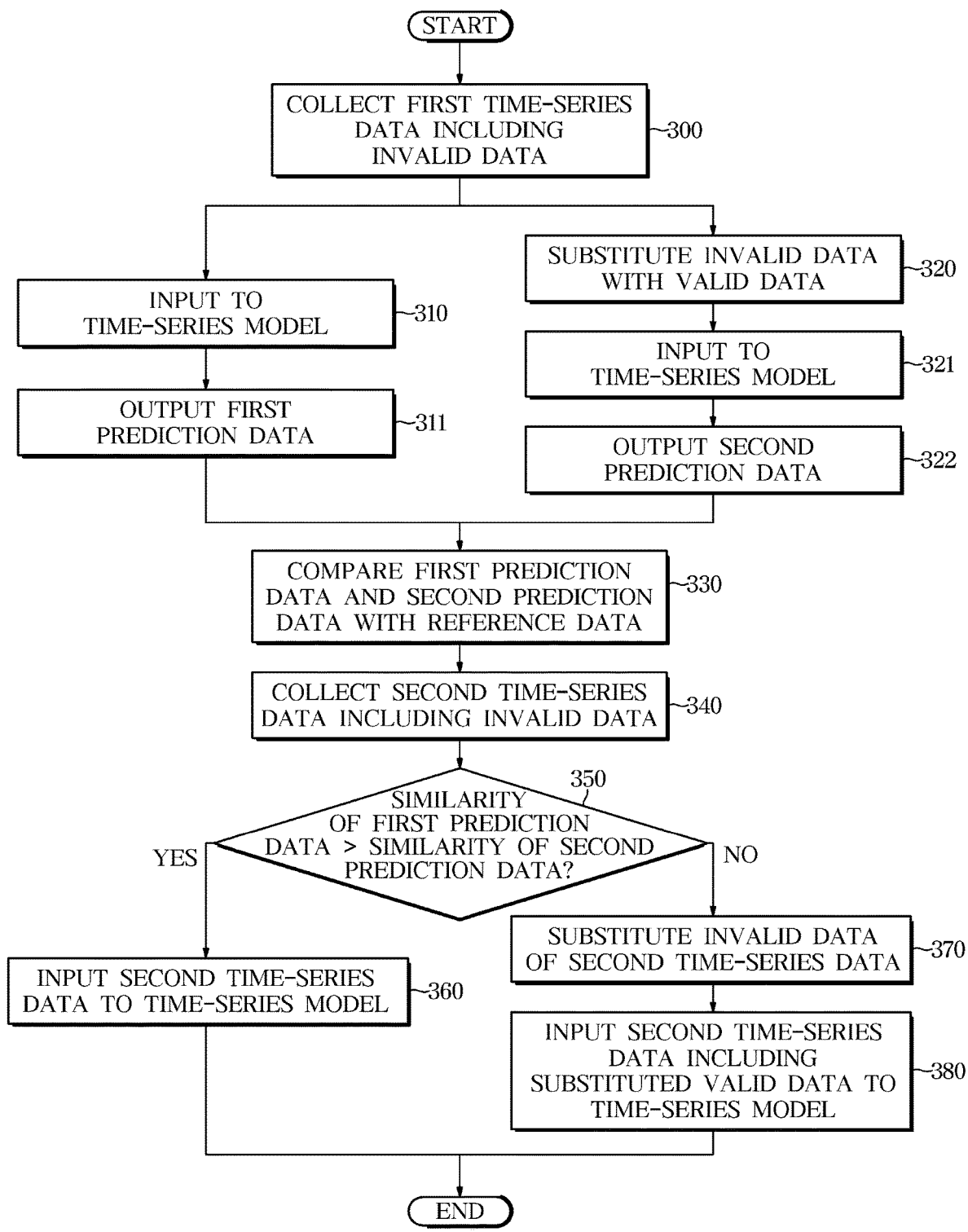
FIG. 7 is a flowchart illustrating a modified example of the embodiment of FIG. 6 according to an embodiment of the disclosure.

FIG. 7 is a flowchart illustrating a modified example of the embodiment of FIG. 6 according to an embodiment of the disclosure.

The time-series data prediction method may examine an effect of time-series data prediction through the first time-series data, before outputting the prediction data of the second time-series data as shown in FIG. 6.

The apparatus may collect first time-series data including invalid data, in operation 300.

The apparatus to which the time-series data prediction method is applied may input the first time-series data including the invalid data to a time-series model without substituting the first time-series data with valid data, in operation 310. The time-series model may output first prediction data based on the first time-series data including the invalid data, in operation 311.

Also, the apparatus may substitute, as in the embodiment of FIG. 5, the first time-series data including the invalid data with valid data, in operation 320, and input the first time-series data including the substituted valid data to a time-series model, in operation 321. The time-series model may output second prediction data based on the first time-series data including the valid data, in operation 322.

The apparatus may compare the first prediction data and the second prediction data with reference data, in operation 330. Also, the apparatus may collect second time-series data, in operation 340.

However, operations 330 and 340 may be performed in a different order.

The apparatus may compare similarity between the first prediction data and the reference data with similarity between the second prediction data and the reference data, in operation 350.

In response to a result of the comparing representing that the similarity between the first prediction data and the reference data is greater than the similarity between the second prediction data and the reference data (YES in operation 350), the apparatus may input the second time-series data to the time-series model, in operation 360.

High similarity between the first prediction data and the reference data may indicate low accuracy of the time-series data prediction method of substituting invalid data. In this case, the time-series data prediction method may input the second time-series data to the time-series model without substituting the invalid data, thereby increasing an effect of a prediction result.

In response to a result of the comparing representing that the similarity between the second prediction data and the reference data is greater than the similarity between the first prediction data and the reference data (NO in operation 350), the apparatus may substitute the invalid data of the second time-series data with the valid data, in operation 370.

The apparatus may input the second time-series data including the substituted valid data to the time-series model, in operation 380.

That is, the time-series data prediction method may consider an effect related to substitution of invalid data, and after the time-series data prediction method determines that the effect is proved, the time-series data prediction method may apply substitution of invalid data to prediction of second time-series data, thereby improving an effect of prediction.

According to an aspect, the time-series data prediction method and apparatus may raise accuracy of prediction data and provide a high-quality service through high accuracy by performing time-series analysis based on input data substituting invalid data.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A time-series data prediction method comprising:
    collecting, by a processor, a first time-series data including a power consumption data for a preset first time period of an air conditioner;
    inputting, by the processor, the first time-series data including invalid data into a time-series model stored in a memory to obtain a first plurality of prediction data including a prediction data corresponding to the invalid data;
    replacing, by the processor, the invalid data included in the first time-series data with preset valid data;
    inputting, by the processor, the first time-series data including the valid data into the time-series model to obtain a second plurality of prediction data including a prediction data corresponding to the replaced valid data;
    obtaining, by the processor, a first similarity between the first plurality of prediction data and a plurality of reference data and a second similarity between the plurality of second plurality of prediction data and the plurality of reference data;
    collecting, by the processor, a second time-series data including a power consumption data for a second time period after the first time period of the air conditioner; and
    determining, by the processor, whether to replace invalid data included in the second time-series data with a preset valid data by comparing the first similarity with the second similarity,
    wherein the invalid data is null data corresponding to power consumption less than or equal to a preset reference value, and the valid data is data other than the null data.

2. The time-series data prediction method of claim 1, wherein the determining of whether to replace invalid data included in the second time-series data with a preset valid data comprises:
    replacing the invalid data included in the second time-series data with the preset valid data based on the second similarity greater than the first similarity.

3. The time-series data prediction method of claim 2, further comprises:
    inputting, by the processor, the second time-series data including the replaced valid data into the time-series model.

4. The time-series data prediction method of claim 3, further comprises:
    obtaining, by the processor, a third plurality of prediction data including a prediction data corresponding to the replaced valid data of the second time-series data as outputs of the time-series model; and
    restoring, by the processor, the prediction data corresponding to the replaced valid data among the third plurality of prediction data into the invalid data.

5. The time-series data prediction method of claim 4, wherein the restoring of the prediction data corresponding to the replaced valid data among the third plurality of prediction data into the invalid data comprises:
    restoring the prediction data being a part of the third plurality of prediction data output from the time-series model to the invalid data based on a period of the invalid data included in the second time-series data.

6. The time-series data prediction method of claim 4, wherein the restoring of the prediction data corresponding to the replaced valid data among the third plurality of prediction data into the invalid data comprises:
    restoring the prediction data being a part of the third plurality of prediction data output from the time-series model to the invalid data through a probability distribution based on a number of pieces of the invalid data included in the second time-series data.

7. The time-series data prediction method of claim 1, wherein the time-series model includes at least one of Prophet, Autoregressive Integrated Moving Average (ARIMA), Recurrent Neural Networks (RNN), Long Short-Term Memory models (LSTM), or Sequence-to-Sequence (Seq2Seq).

8. An apparatus comprising:
    a memory storing a time-series model; and
    a processor configured to:
        collect a first time-series data including a power consumption data for a preset first time period of an air conditioner,
        input the first time-series data including invalid data into a time-series model to obtain a first plurality of prediction data including a prediction data corresponding to the invalid data,
        replace the invalid data included in the first time-series data with preset valid data,
        input the first time-series data including the valid data into the time-series model to obtain a second plurality of prediction data including a prediction data corresponding to the replaced valid data,
        obtain a first similarity between the first plurality of prediction data and a plurality of reference data and a second similarity between the plurality of second plurality of prediction data and the plurality of reference data, collect a second time-series data including a power consumption data for a second time period after the first time period of the air conditioner, and determine whether to replace invalid data included in the second time-series data with a preset valid data by comparing the first similarity with the second similarity, wherein the invalid data is null data corresponding to power consumption less than or equal to a preset reference value, and the valid data is data other than the null data.

9. The apparatus of claim 8, wherein the processor is further configured to:

replace the invalid data included in the second time-series data with the preset valid data based on the second similarity greater than the first similarity.

10. The apparatus of claim 9, wherein the processor is further configured to:

input the second time-series data including the replaced valid data into the time-series model.

11. The apparatus of claim 10, wherein the processor is further configured to:

obtain a third plurality of prediction data including a prediction data corresponding to the replaced valid data of the second time-series data as outputs of the time-series model, and restore the prediction data corresponding to the replaced valid data among the third plurality of prediction data into the invalid data.

12. The apparatus of claim 11, wherein the processor is further configured to:

restore the prediction data being a part of the third plurality of prediction data output from the time-series model to the invalid data based on a period of the invalid data included in the second time-series data.

13. The apparatus of claim 11, wherein the processor is further configured to:

restore the prediction data being a part of the third plurality of prediction data output from the time-series model to the invalid data through a probability distribution based on a number of pieces of the invalid data included in the second time-series data.

14. A system comprising:

an air conditioner; and a server configured to communicate with the air conditioner, wherein the server is configured to:

collect a first time-series data including a power consumption data for a preset first time period of the air conditioner, input the first time-series data including invalid data into a time-series model to obtain a first plurality of prediction data including a prediction data corresponding to the invalid data, replace the invalid data included in the first time-series data with preset valid data, input the first time-series data including the valid data into the time-series model to obtain a second plurality of prediction data including a prediction data corresponding to the replaced valid data, obtain a first similarity between the first plurality of prediction data and a plurality of reference data and a second similarity between the plurality of second plurality of prediction data and the plurality of reference data, collect a second time-series data including a power consumption data for a second time period after the first time period of the air conditioner, and determine whether to replace invalid data included in the second time-series data with a preset valid data by comparing the first similarity with the second similarity, wherein the invalid data is null data corresponding to power consumption less than or equal to a preset reference value, and the valid data is data other than the null data.

15. The system of claim 14, wherein the server is further configured to:

replace the invalid data included in the second time-series data with the preset valid data based on the second similarity greater than the first similarity.

16. The system of claim 15, wherein the server is further configured to:

input the second time-series data including the replaced valid data into the time-series model.

17. The system of claim 16, wherein the server is further configured to:

obtain a third plurality of prediction data including a prediction data corresponding to the replaced valid data of the second time-series data as outputs of the time-series model, restore the prediction data corresponding to the replaced valid data among the third plurality of prediction data into the invalid data, and transmit the third plurality of prediction data including the restored invalid data to the air conditioner.

18. The system of claim 17, wherein the server is further configured to:

restore the prediction data being a part of the third plurality of prediction data output from the time-series model to the invalid data based on a period of the invalid data included in the second time-series data.

19. The system of claim 17, wherein the server is further configured to:

restore the prediction data being a part of the third plurality of prediction data output from the time-series model to the invalid data through a probability distribution based on a number of pieces of the invalid data included in the second time-series data.

* * * * *